(12) United States Patent
Matthews, Jr. et al.

(10) Patent No.: US 6,321,247 B1
(45) Date of Patent: Nov. 20, 2001

(54) SYSTEM AND METHOD FOR MULTIPLICATION MODULO ($2^N+1$)

(75) Inventors: Donald P. Matthews, Jr., Campbell; Susan K. Langford, Sunnyvale, both of CA (US)

(73) Assignee: Compaq Computer Corporation, Cupertino, CA (US)

( * ) Notice: Subject to any disclaimer, the term of this patent is extended or adjusted under 35 U.S.C. 154(b) by 0 days.

(21) Appl. No.: 09/222,254

(22) Filed: Dec. 28, 1998

(51) Int. Cl.[7] ............................................. G06F 7/38
(52) U.S. Cl. ......................................................... 708/491
(58) Field of Search ............................ 380/28; 708/491–492

(56) References Cited

U.S. PATENT DOCUMENTS 5,640,455 * 6/1997 Shimada ................................. 380/28
5,928,315 * 7/1999 Kobayashi et al. ................... 708/491
6,038,317 * 3/2000 Magliveras et al. .................... 380/28
6,049,815 * 4/2000 Lambert et al. ....................... 708/492

OTHER PUBLICATIONS

Book entitled *Applied Cryptography: Protocols, Algorithms, and Source Code in C* by Bruce Schneier, published by John Wiley & Sons, Inc. 1996, pp. 319–325 and applicable page of Errata (Dec. 1996).

* cited by examiner

*Primary Examiner*—Tan V. Mai
(74) *Attorney, Agent, or Firm*—Fenwick & West LLP

(57) ABSTRACT

A system and method are provided for performing modulo multiplication of two numbers N bits long with a modulus of $2^N+1$, where the resulting modulus is determined without a need to perform successive reductions. Without a need to perform successive reductions, a hardware implementation does not require a divider circuit.

17 Claims, 5 Drawing Sheets

US 6,321,247 B1

SYSTEM AND METHOD FOR MULTIPLICATION MODULO ($2^N+1$)

TECHNICAL FIELD OF THE INVENTION

This invention relates generally to processing data, and more particularly to a system and method for using a fast implementation of modulo multiplication.

BACKGROUND OF THE INVENTION

Modulo multiplication is an arithmetic process of determining the remainder of the product of two numbers. Modulo multiplication is a particularly versatile tool that has many applications in the computer field. For example, specific implementations of cryptography use modulo multiplication to perform certain processing functions. The remainder of modulo multiplication, also known as the residue of the modulo of the product of two numbers is typically used in many data processing applications.

In the field of cryptography many different types of encryption and decryption have been developed to prevent unauthorized file access. IDEA, a block cipher, developed by Xuejia Lai and James Massey and patented under International Patent PCT/CH91/00117 on Nov. 28, 1991, and a patent held by Ascom-Tech AG of Magenwil, Switzerland, is one example of a type of encryption/decryption method that utilizes modulo multiplication. On page 320 of *Applied Cryptography*, Bruce Schneier describes IDEA as a cipher that operates on 64-bit plaintext blocks and has a key of 128 bits in length. IDEA uses the same algorithm for both encryption and decryption.

IDEA uses an algorithm that includes a combination of operations from different algebraic groups. The three algebraic groups include "XOR," "Addition modulo $2^{16}$," and "multiplication modulo $2^{16}+1$." The three algebraic groups of IDEA can be implemented in both hardware and software to perform the encryption/decryption of this cipher.

Although IDEA is effective in its use of multiplication modulo $2^{16}+1$, the conventional process for determining a remainder from the division of two binary numbers requires reductions that are both costly and time consuming. Furthermore, a conventional hardware implementation of modulo multiplication requires a divider circuit. An example of a conventional process for performing modulo multiplication is shown below.

(1) A*B mod M
(2) Where: M=$2^N+1$
(3) N=4
(4) M=$2^4+1$
(5) M=17 (base 10)
(6) A=01010 (base 2)=10 (base 10)
(7) B=01110 (base 2)=14 (base 10)

```
(8)  A*B:  (base 2)
        01010
        01110
       010100
        01010
        01010
        00000
(9)  10001100
```

Line 1 above shows the modulo multiplication equation of (A*B mod M), where A, B and M are each binary numbers. Line 2 shows that modulus "M" is equal to two to the power of N, plus one, where "N+1" is the length in bits of both variables A and B. Line 3 shows that in this example the bit length of N is equal to four. Hence, in line 4, "M" is equal to two to the fourth power plus one. Line 5 shows that the result of the equation of line 4 has the base 10 value of 17. Lines 6 and 7 show both the binary and corresponding decimal values chosen for the variables "A" and "B" of line 1. Line 8 shows multiplication of the binary values of variable "A" and "B." Line 9 shows that the resulting product of the equation of line 8 is the binary value "10001100."

FIG. 1 shows an example of a conventional process for determining the resulting modulus of the product of variables "A" and "B." As shown, a conventional process for this example requires four successive reductions of the product of A and B by modulus "M." The result of the four reductions yields the resulting modulus, also known as a remainder or residue, having a binary value "00000100."

A conventional hardware circuit of the modulo operation of FIG. 1 would include a divider circuit to perform the successive reductions required to determine the remainder of the product of "A" and "B." The four successive reductions would require four repetitive cycles of a divider circuit. One of ordinary skill in the art will understand, that as "A," "B" and the resulting product of "A" and "B" grow larger, the number of repetitive cycles needed to determine the remainder will also increase. It will be appreciated that a need to perform numerous cycles of a divider circuit to determine a remainder is costly, slow and requires excessive processing resources.

Therefore, there is a need to provide a system and method for performing fast and efficient modulo multiplication that minimizes processing requirements.

SUMMARY OF THE INVENTION

The present invention provides a first and second embodiment of a system and method for performing a modulo multiplication of two numbers, where the remainder is determined without a need to perform successive reductions. In the first embodiment, the present invention performs modulo multiplication of two numbers N+1 bits long with a modulus for all numbers having a value of $2^N+1$. In the second embodiment which is applicable to "IDEA" cryptography where the value "0" is used to represent $2^N$, the present invention performs modulo multiplication of two numbers N+1 bits long with a modulus for prime numbers having a value of $2^N+1$. It will be appreciated that since "0" is used to represent $_2{}^N$, the two numbers are stored as N bits but are multiplied as two N+1 bit numbers, the additional bit being generated for identifying the zero case. Since the present invention eliminates the need to perform successive reductions, a hardware implementation of the present invention does not require a divider circuit. One of ordinary skill in the art will understand that eliminating successive reductions reduces processing cycles, thereby promoting performance gains and cost savings.

From a system point of view, a first embodiment of the invention performs modulo multiplication of two numbers N+1 bits in length with a modulus equal to $2^N+1$ and where each of the numbers has a value less than a value of the modulus. The system of the first embodiment comprises: a multiplier module for multiplying the two numbers to yield a resulting product having a 2N+1 bit result, a high bit portion and a low bit portion; an inverter module coupled to the multiplier module for inverting the bits of the high bit portion; a compare module coupled to the multiplier module for comparing the high bit portion and the low bit portion to determine an additional value; and a first adder module coupled to the multiplier module and the inverter module for determining a remainder from a sum of the inverted high bit portion, the low bit portion, a value of one and the additional value.

From a system point of view, a second embodiment of the invention performs modulo multiplication of two numbers N+1 bits in length with a modulus equal to $2^N+1$ and where a value of zero is used to represent $2^N$ and where each of the numbers has a value less than a value of the modulus. The system of the second embodiment comprises: a multiplier module for multiplying the two numbers to yield a resulting product having a high bit portion and a low bit portion; an inverter module coupled to the multiplier module for inverting the bits of the high bit portion; a compare module coupled to the multiplier module for comparing the high bit portion and the low bit portion to determine an additional value; and a first adder module coupled to the multiplier module and the inverter module for determining a remainder from a sum of the inverted high bit portion, the low bit portion, a value of one and the additional value.

From a method point of view, a first embodiment of the invention performs modulo multiplication of two numbers N+1 bits in length with a modulus equal to $2^N+1$ and where each of the numbers has a value less than a value of the modulus. The method of the first embodiment comprises: multiplying two numbers to yield a resulting product having a 2N+1 bit, a high bit portion and a low bit portion; inverting all bits of the high bit portion; determining a remainder from a sum of the inverted high bit portion, the low bit portion and a value of one; comparing the high bit portion and the low bit portion to determine an additional value; and adding the additional value to the remainder.

From a method point of view, a second embodiment of the invention performs modulo multiplication of two numbers N+1 bits in length with a modulus equal to $2^N+1$ and where a value of zero is used to represent $2^N$ and where each of the numbers has a value less than a value of the modulus. The method of the second embodiment comprises: multiplying two numbers to yield a resulting product having a high bit portion and a low bit portion; inverting all bits of the high bit portion; determining a remainder from a sum of the inverted high bit portion, the low bit portion and a value of one; comparing the high bit portion and the low bit portion to determine an additional value; and adding the additional value to the remainder.

The invention may be better appreciated from the following Figures, taken together with the accompanying Detailed Description of the Invention.

DESCRIPTION OF THE PREFERRED EMBODIMENTS

The following describes the best presently contemplated mode of carrying out the invention. The description illustrates the general principles of the invention and is not to be considered limiting.

Figure 1:
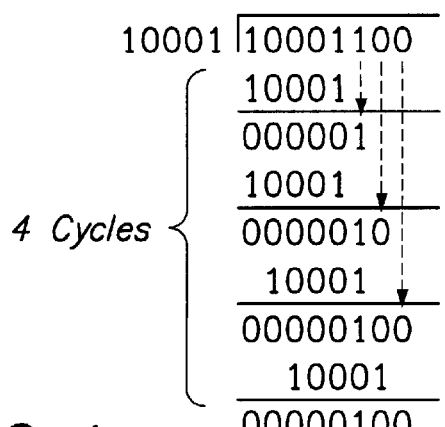
FIG. 1 is a diagram of the prior art method of performing successive reductions to determine the resultant modulus of a binary number.
Figure 2A:
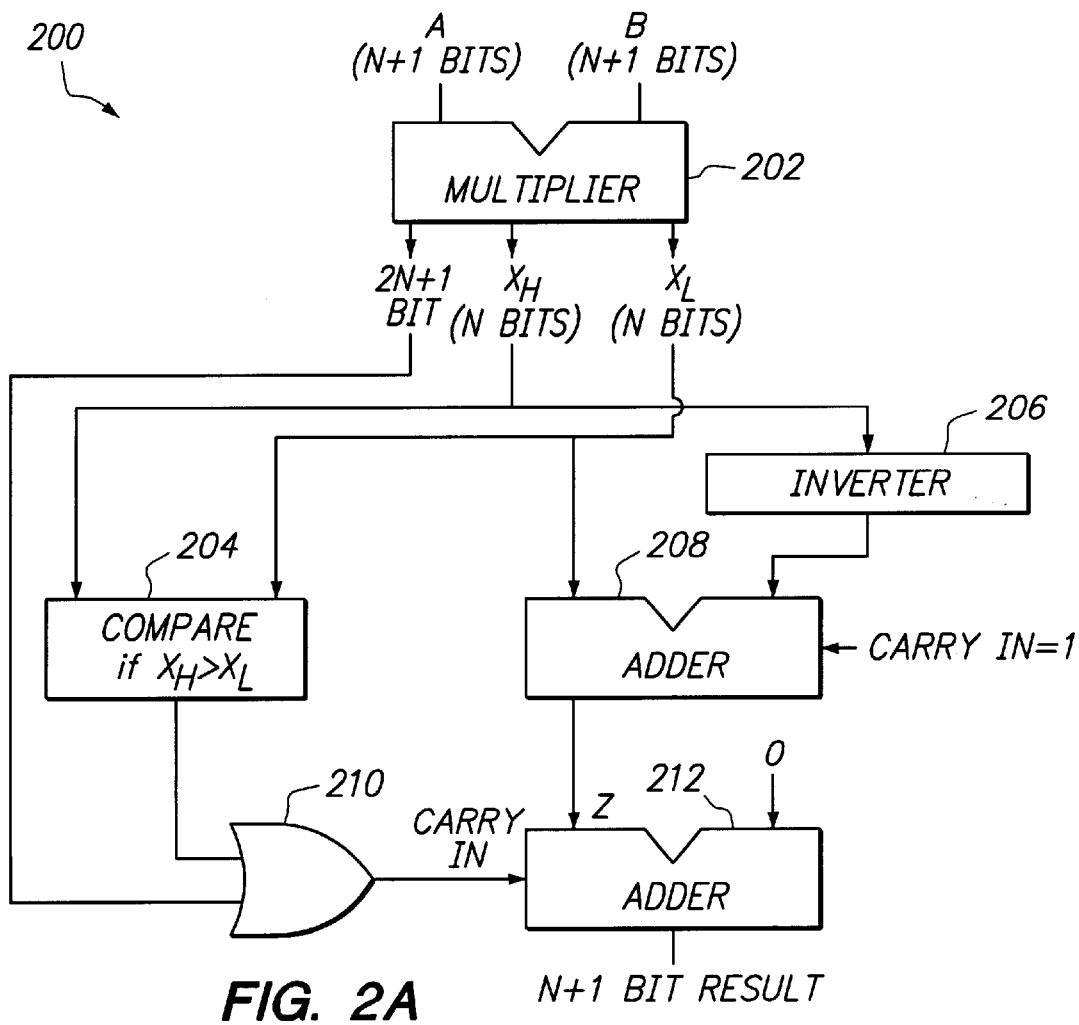
FIG. 2A is a block diagram of a first embodiment of the modulo multiplication circuit, in accordance with the present invention.

FIG. 2A is a block diagram of the modulo multiplication circuit 200 for the first embodiment of the present invention. Circuit 200 includes multiplier module 202 coupled to compare module 204, inverter module 206 and adder module 208. Compare module 204 is coupled to OR gate 210, and OR gate 210 and adder module 208 are coupled to adder module 212. As shown, multiplier module 202 receives input of the binary values of numbers "A" and "B." It will be appreciated that circuit 200 performs modulo multiplication of (A*B mod M) where the value of "A" and "B" are N+1 bits long and the modulus M has a value of $2^N+1$. It will also be appreciated that each value of "A" and "B" is fully reduced and therefore has a value less than modulus M. Multiplier module 202 calculates in binary form the product of the values of variables "A" and "B." The resulting product is separated to include a 2N+1 bit, high binary bits $X_H$ and low binary bits $X_L$. The following is an example of the steps performed by multiplier module 202:

(1) A=0100 (base 2)=4 (base 10)

(2) B=0110 (base2)=6 (base 10)

(3)  A*B:  (base 2)

0100

× 0110

01000

0100

0000

(4)   0011000

(5) $X_H$=011

(6) $X_L$=000

(7) 2N+1 bit=0

Hence, in the above example, multiplier module 202 separates the resulting product of line 4 among the 3 low bits where $X_L$="000," the next 3 bits where $X_H$ is equal to "011," and the "2N+1" bit equal to "0".

Inverter module 206 receives as input the binary value of $X_H$. Inverter module 206 inverts the bits of the binary value of $X_H$. The following is an example of the steps performed by inverter module 206:

(8) $X_H$=011 (INPUT)

(9) $\overline{X_H}$=100 (INVERTED OUTPUT)

Adder module 208 receives as input the inverted binary value of $X_H$, the binary value of $X_L$ and a carry-in bit having a value of "1." It will be appreciated that in alternative embodiments of the present invention, the value of "1" need not be provided as a carry-in bit. Adder module 208 calculates the sum of the inverted binary value of $X_H$ and the binary value of $X_L$, and then adds a carry-in bit having a value of 1. The following is an example of the steps performed by adder module 208.

(10)  $X_L = 000$
      +
      $\overline{X}_H = \underline{100}$
(11)        100
(12)   100
       +
       $\underline{001}$  (carry-in)
(13)   101
(14)   101  (no carry-out)

As shown above, on line 10 the sum of the inverted binary value of $X_H$ and the binary value of $X_L$ yield on line 11 the binary result "100." On line 12, adder module 208 adds carry-in bit "001" to the sum "100" to yield the result on line 13 of "101." It will be appreciated on line 14 that only the bits corresponding to the original length of N bits of $X_L$ and $X_H$ are retained. Therefore, since the result on line 11 includes 3 bits, and N is equal to 3, there is no need to remove a carry-out bit from the sum of $X_L$ and $\overline{X}_H$.

Compare module 204 receives as input the binary value of $X_H$ and the binary value of $X_L$. Compare module 204 determines if the binary value of $X_H$ is greater than or equal to the binary value of $X_L$. If the binary value of $X_H$ is greater than or equal to the binary value of $X_L$ compare module 204 sends a value of "1" to OR gate 210 else compare module 204 sends a value of "0." The following is an example of the steps performed by compare module 204:

(15) $X_H$=011
(16) $X_L$=000
(17) Performed by compare module 204 $X_H$>$X_L$ then send "1":011>000 (true)

As shown above, on line 17, compare module 204 compares the binary value "011" of $X_H$ with the binary value "000" of $X_L$. Since the binary value of $X_H$ is greater than the binary value of $X_L$ compare module 204 sends a value of "1" to OR gate 210.

"OR" gate 210 receives either a high or low bit value from compare module 204 and the "2N+1" bit from multiplier 202. The output of "OR" gate 210 is carrying-in bit that adder module 212 adds to the input from adder module 208. The following is an example of the steps performed by OR gate 210 and adder module 212:

(18) Performed by "OR" gate 210
     1 OR 0 = 1
(19) Performed by adder module 212
     101
     +
     $\underline{0001}$
(20) 0110 = Remainder As shown above, on line 18, OR gate 210 performs an OR function of the "1" bit value provided by compare module 204 and the "0" bit value provided by multiplier 202 to yield the result of "1". On line 19, adder module 212 determines the remainder of (A*B mod M) by adding the result of compare module 204 and the output of adder module 208. The remainder has a bit length of N+1.

It will be appreciated that the above modulo multiplication example performed by the present invention does not require a divider circuit. It will be further appreciated that since the present invention does not require reductions of the product of "A" and "B", the present invention requires less cycles to perform modulo multiplication than is currently required by conventional modulo multiplication methods. One of ordinary skill in the art will understand that a reduction in the number of processing cycles results in significant performance gains and cost savings.

Figure 2B:
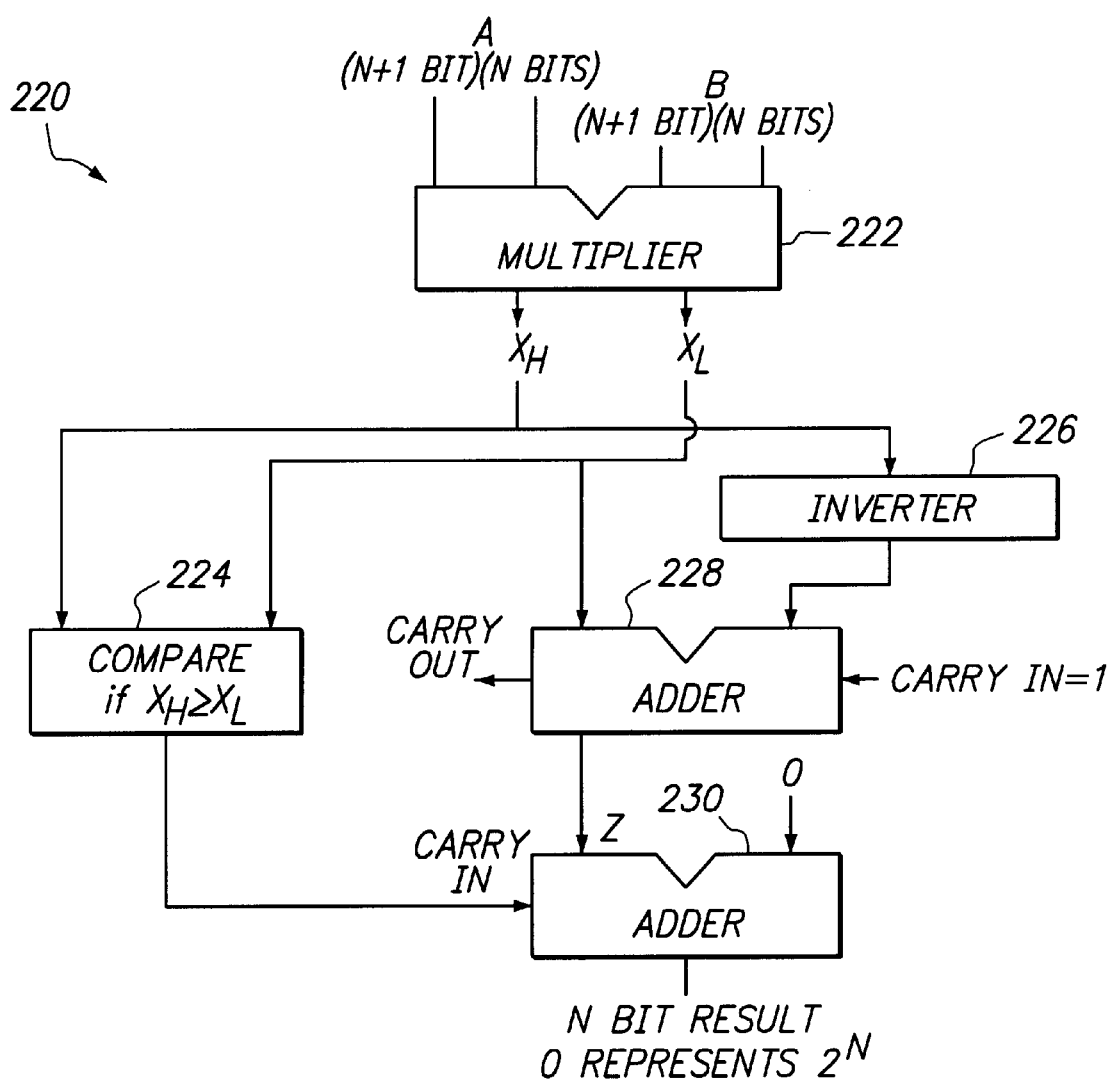
FIG. 2B is a block diagram of a second embodiment of the modulo multiplication circuit, in accordance with the present invention.

FIG. 2B is a block diagram of the modulo multiplication circuit 220 for the second embodiment of the present invention. Circuit 220 performs modulo multiplication of (A*B mod M) where the value of "A" and "B" are N+1 bits long and the modulus M is a prime number and has a value of $2^N+1$. It will be appreciated that each value of "A" and "B" is fully reduced and therefore has a value less than modulus M. It will also be appreciated that since $2^N$ is represented by zero, A and B are stored as N bit numbers. Circuit 220 includes multiplier module 222 coupled to compare module 224, inverter module 226 and adder module 228. Compare module 224 and adder module 228 are coupled to adder module 230. As shown, multiplier module 222 receives input of the binary values of "A" and "B" where the N+1 bit of "A" is set to "1" if "A" is equal to zero and where the N+1 bit of "B" is set to "1" if "B" is equal to zero. If "A" is not equal to zero the N+1 bit of "A" is set to "0" and if "B" is not equal to zero the N+1 bit of "B" is set to "0". Multiplier module 222 is an N+1 times N+1 bit multiplier that calculates in binary the 2N bit product of the values of variables "A" and "B" and bifurcates the resulting product to include the high binary bits $X_H$ and the low binary bits $X_L$. In the case where the stored value of A or B is equal to zero (used to represent $2^N$) the value input to the multiplier will be $2^N$. The following is an example of the steps performed by multiplier module 222:

(1) A=01010 (base 2)=10 (base 10)
(2) B=01110 (base 2)=14 (base 10)

(3) $A*B$: (base 2)
          01010
          $\underline{01110}$
         010100
          01010
          01010
          $\underline{00000}$
(4) 10001100

(5) $X_H$=1000
(6) $X_L$=1100

Hence, in the above example, multiplier module 222 bifurcates the resulting product of line 4 among the 4 high bits where $X_H$ is equal to 1000, and among the 4 low bits where $X_L$=1100.

Inverter module 226 receives as input the binary value of $X_H$. Inverter module 226 inverts the bits of the binary value of $X_H$. The following is an example of the steps performed by inverter module 226:

(7) $X_H$=1000 (INPUT)
(8) $\overline{X}_H$=0111 (INVERTED OUTPUT)

Adder module 228 receives as input the inverted binary value of $X_H$ the binary value of $X_L$ and a carry-in bit having a value of "1". It will be appreciated that for alternative embodiments of the present invention, the value of "1" need not be provided as a carry-in bit. Adder module 228 calculates the sum of the inverted binary value of $X_H$ and the binary value of $X_L$, and then adds a carry-in bit having a value of 1. The following is an example of the steps performed by adder module 228:

(9)  $X_L$ = 1100

+

$\overline{X}_H$ = 0111

(10)    10011

(11)   10011

00001   (carry-in)

(12)   10100

(13)   0100   (sum after carry-out = "1")

As shown above, on line 9 the sum of the inverted binary value of $\overline{X}_H$ and the binary value of $X_L$ yields on line 10 the binary result "10011." On line 11, adder module 228 adds carry-in bit "0001" to the sum "10011" to yield the result on line 12 of "10100." It will be appreciated that adder module 228 outputs to adder module 230 only the bits corresponding to the original length of N bits of $X_L$ and $X_H$. Therefore, since the result on line 12 includes 5 bits, and N is equal to 4, the highest bit with a value of "1" is a carry-out bit that is deleted so that the sum of $X_L$, $\overline{X}_H$, and a carry-in bit is "0100."

Compare module 224 receives as input the binary value of $X_H$ and the binary value of $X_L$. Compare module 224 determines if the binary value of $X_H$ is greater than or equal to the binary value of $X_L$. If the binary value of $X_H$ is greater than or equal to the binary value of $X_L$ then the value of the carry-in bit to adder module 230 is equal to one. If the binary value of $X_H$ is less than the binary value of $X_L$ then the value of the carry-in bit for adder module 230 is equal to zero. Therefore, it will be appreciated that the output of adder module 228 is not affected by adder module 230, so that the output of adder module 228 and the output of adder module 230 are equal. The following is an example of the steps performed by compare module 224 and adder module 230.

(14) Performed by compare module 224 $X_H \geq X_L$ then carry-in="1":1000≧1100 (false) →carry-in=0

0100

+

0000

(16)   0100

As shown above, on line 14, compare module 224 compares the binary value "1000" of $X_H$ with the binary value "1100" of $X_L$. Since the binary value of $X_H$ is less than the binary value of $X_L$, as shown in line 15, adder module 230 adds a carry-in bit with a value of zero to the remainder binary value of "0100." Consequently, the binary value of the remainder is "0100."

It will be appreciated that the above modulo multiplication example performed by the present invention does not require a divider circuit. It will be further appreciated that since the present invention does not require reductions of the product of "A" and "B", the present invention requires less cycles to perform modulo multiplication than is currently required by conventional modulo multiplication methods.

One of ordinary skill in the art will understand that a reduction in the number of processing cycles results in significant performance gains and cost savings.

Figure 3:
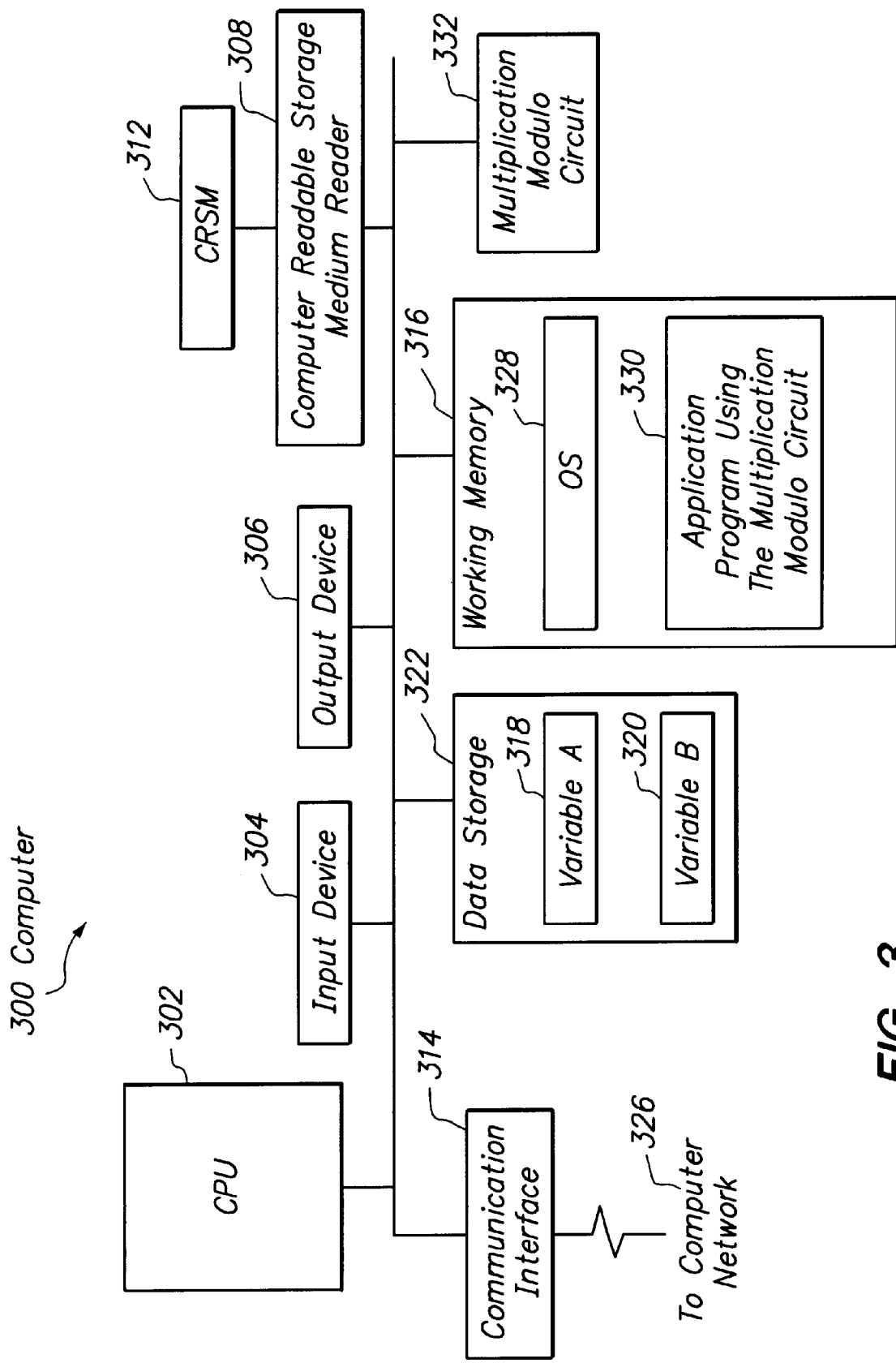
FIG. 3 is a block diagram illustrating details of an example computer that includes a modulo multiplication circuit.

FIG. 3 is a block diagram illustrating details of a computer 300. Computer 300 includes a Central Processing Unit (CPU) 302 such as a Motorola Power PC™ microprocessor or an Intel Pentium™ microprocessor. Multiplication modulo circuit 332, an input device 304 such as a keyboard and mouse, an output device 306 such as a Cathode Ray Tube (CRT) display, and a computer readable storage medium reader 308 such as a CD ROM drive are coupled via signal bus 310 to CPU 302. Computer readable storage medium reader 308 reads from a computer readable storage medium 312 such as a CD. A communications interface 314, a data storage device 322 such as Read Only Memory (ROM) or a magnetic disk, and working memory 316 such as Random-Access memory (RAM) are further coupled via signal bus 310 to CPU 302. As shown, the value of variable A 318 and the value of variable B 320 are stored on data storage device 322. Computer 300 further includes a communications interface 314 coupled to computer network 326.

Multiplication modulo circuit 332 may include either the first embodiment circuit 200 or the second embodiment circuit 220. It will be appreciated that for alternative embodiments of the present invention multiplication modulo circuit 332 may be included within other elements of computer 300.

Working memory 316 stores operating system 328 for executing programs and performing basic tasks such as recognizing input from the keyboard, sending output to the display screen, keeping track of files and directories on the disk and controlling peripheral devices such as disk drives and printers. One of ordinary skill in the art will understand that if computer network 326 is the Internet, computer 300 may include an internet engine such as a web browser, e.g., the Netscape™ web browser produced by the Netscape Corporation or the Internet Explorer™ web browser produced by the Microsoft Corporation. Working memory 316 also stores an application program 330 that utilizes multiplication modulo circuit 332 to provide a processing function. For example, in an embodiment, application program 330 performs encryption and decryption by utilizing multiplication modulo circuit 332. It will be appreciated that IDEA, a block cipher developed by Xuejia Lai and James Massey and patented under International Patent PCT/CH91/00117 on Nov. 28, 1991, being a patent held by Ascom-Tech AG of Magenwil, Switzerland, is an example cipher that may be used by an application program that utilizes multiplication modulo circuit 332. It will further be appreciated that alternative embodiments of the present invention may include application programs that utilize multiplication modulo circuit 332 to perform other functions.

Figure 4A:
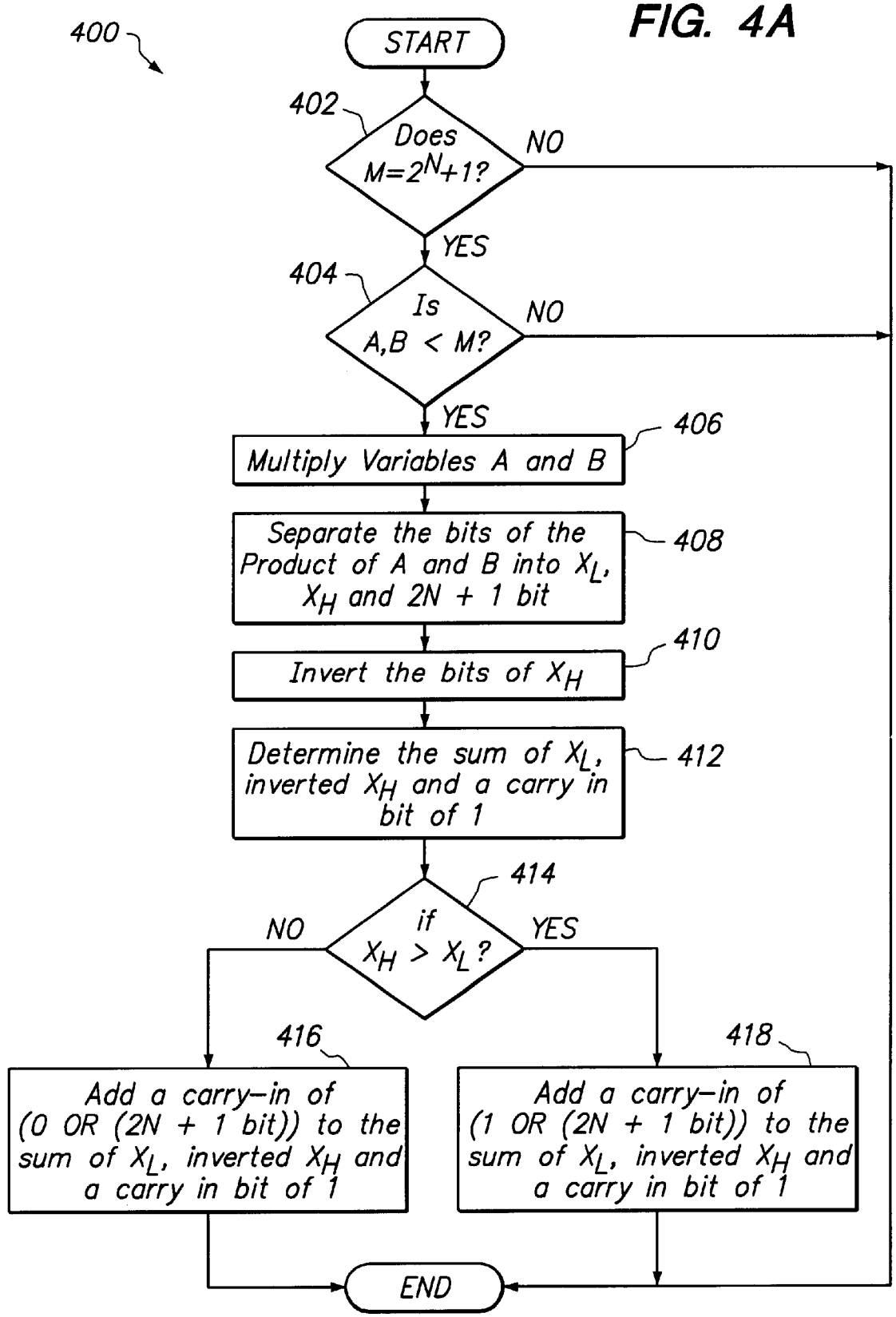
FIG. 4A is a flowchart illustrating modulo multiplication in accordance with the first embodiment of the present invention.

FIG. 4A is a flowchart illustrating a modulo multiplication method 400 in accordance with the first embodiment of the present invention. Method 400 begins in step 402 by determining if the value of modulus "M" is equal to $2^N+1$ for the equation (A*B mod M) where (N+1) is the length in bits of variables A and B. If the modulus is equal to $2^N+1$, in step 404 determine if the value of variables A and B are fully reduced and are therefore each less than the value of modulus "M." If the value of modulus "M" is not equal to $2^N+1$ modulo multiplication method 400 does not apply to this specific case. If in step 404 variables A and B are each not less than the value of M, modulo multiplication method 400 does not apply to this case. If in step 404 the value of variables A and B are each less than the value of modulus M, in step 406 multiply the binary value of variable A having a bit length of N bits with variable B having a bit length of N bits. In step 408, separate the product of variables A and B among $X_H$, $X_L$, and a 2N+1 bit, where $X_H$ includes N high bits and $X_L$ includes N low bits. In step 410, invert the bits of the binary value of $X_H$. In step 412, add $X_L$, inverted bits of $X_H$ and a carry-in bit of "1." It will be appreciated that only the bits corresponding to the original length of N bits of $X_L$ and $\overline{X}_H$ are retained. Therefore, the carry-out bit is deleted. In step 414, determine if $X_H$ is greater than $X_L$. If $X_H$ is less than or equal to $X_L$ in step 416 add a carry-in bit of (0OR(2N+1 bit)) to the sum of $X_L$, $\overline{X}_H$ and a carry-in bit of 1. If $X_H$ is greater than $X_L$ in step 418 add a carry-in bit of (1 OR (2N+1 bit)) to the sum of $X_L$, $\overline{X}_H$ and a carry-in bit of 1. The result of steps 416 or 418 is the remainder of the modulo multiplication ((A*B) mod M). It will be appreciated that the addition of "1" or "0" in alternative embodiments of the present invention need not be provided in a carry-in bit.

Figure 4B:
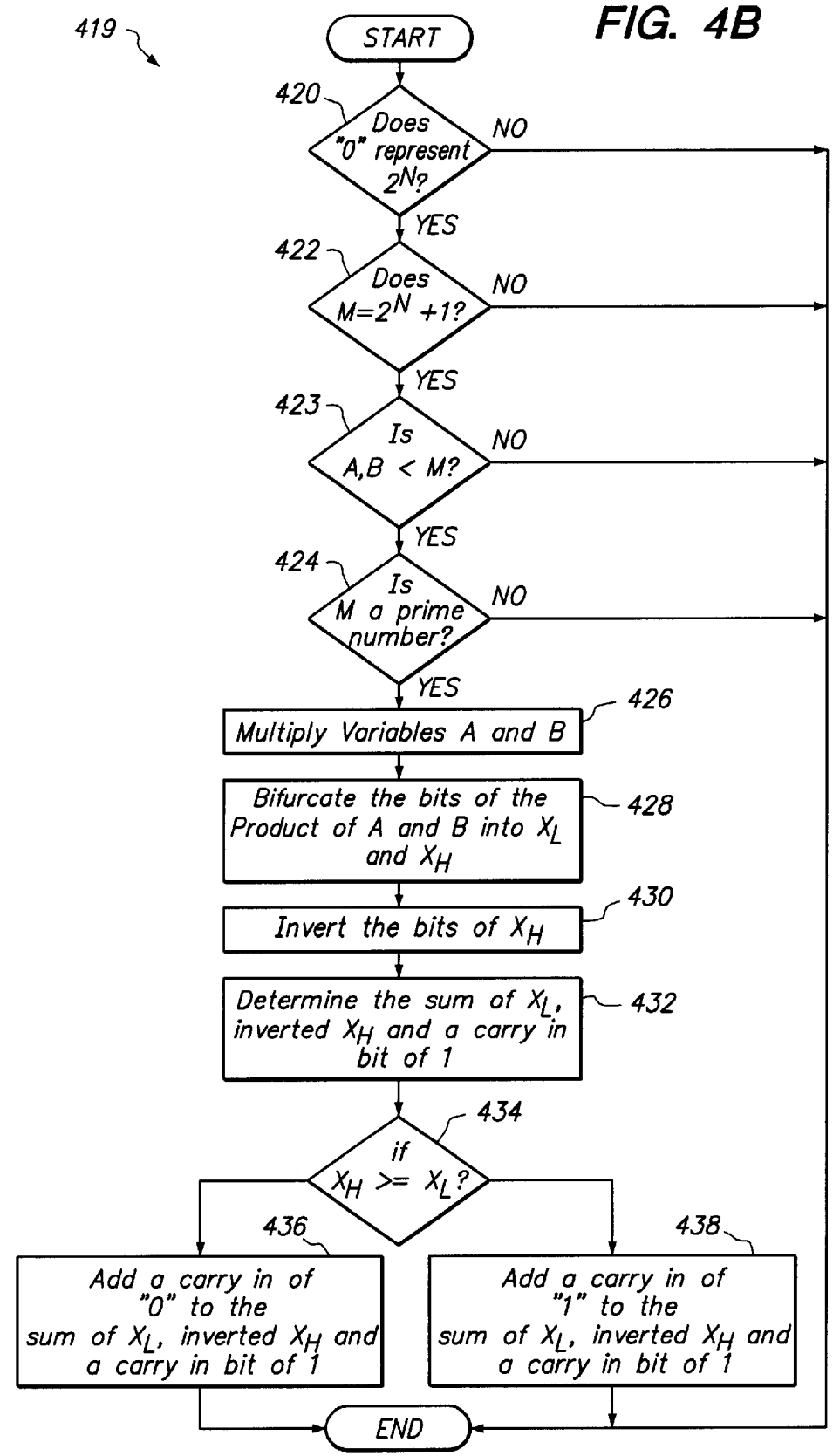
FIG. 4B is a flowchart illustrating modulo multiplication in accordance with the second embodiment of the present invention.

FIG. 4B is a flowchart illustrating a modulo multiplication method 419 in accordance with a second embodiment of the present invention. Method 419 begins in step 420 by determining if the value "0" is used to represent $2^N$ where "N" is the bit length of variables "A" and "B" for the modulo multiplication of (A*B mod M). If the value "0" does not represent $2^N$ then this case does not apply to modulo multiplication method 419. If "0" represents $2^N$ in step 422 determine if the value of modulus "M" is equal to $2^N+1$. If the value of modulus "M" is not equal to $2^N+1$ then this case does not apply to modulo multiplication method 419. If the modulus is equal to $2^N+1$, in step 422 determine if the values of variables A and B are fully reduced and are therefore each less than the value of modulus "M." If variables A and B are each not less than the value of M modulo multiplication method 419 does not apply to this case. If the value of variables "A" and "B" is less than the value of modulus M, in step 424 determine if modulus "M" is a prime number. If modulus "M" is not a prime number then this case does not apply to modulo multiplication method 419. If modulus "M" is a prime number then modulo multiplication method 419 applies to this case.

In step 426 multiply the binary value of variable A having a bit length of N bits with variable B having a bit length of N bits. In step 428, bifurcate the product of variables A and B among $X_H$ and $X_L$, where $X_H$ includes the high bits and $X_L$ includes the low bits. In step 430, invert the bits of the binary value of $X_H$. In step 432, add $X_L$, $\overline{X}_H$ and a carry-in bit of "1." It will be appreciated that only the bits corresponding to the original length of N bits of $X_L$ and $X_H$ are retained. Therefore, the carry-out bit is deleted. In step 434, determine if $X_H$ is greater than or equal to $X_L$. If $X_H$ is not greater than or equal to $X_L$ then in step 436 add a carry-in bit with a value of "0" to the output of step 432. If $X_H$ is greater than $X_L$ then in step 438 add a carry-in bit of "1" to the output of step 412. The result of steps 436 or 438 is the remainder of the modulo multiplication of (A*B mod M). It will be appreciated that the addition of "1" or "0" in alternative embodiments of the present invention need not be provided in a carry-in bit.

It can therefore be appreciated that a new and novel has been described. It will be appreciated by those skilled in the art that, given the teaching herein, numerous alternatives and equivalents will be seen to exist which incorporate the invention disclosed hereby. As a result, the invention is not to be limited by the foregoing exemplary embodiments, but only by the following claims.

What is claimed is:

1. A system for performing modulo multiplication of two numbers N+1 bits in length with a modulus equal to $2^N+1$ and where each of the numbers has a value less than a value of the modulus, the system comprising:

a multiplier module for multiplying the two numbers to yield a resulting product having a 2N+1 bit, a high bit portion and a low bit portion;

an inverter module coupled to the multiplier module for inverting the bits of the high bit portion;

a compare module coupled to the multiplier module for comparing the high bit portion and the low bit portion to determine an additional value; and a first adder module coupled to the multiplier module and the inverter module for determining a remainder from a sum of the inverted high bit portion, the low bit portion, a value of one and the additional value.

2. The system of claim 1, wherein the compare module outputs a first value if the high bit portion is greater than the low bit portion, and outputs a second value if the high bit portion is less than or equal to the low bit portion.

3. The system of claim 2 further including an OR gate to generate the additional value by performing an OR function of the first value and the 2N+1 bit if the high bit portion is greater than the low bit portion and by performing an OR function of the second value and the 2N+1 bit if the high bit portion is less than the low bit portion.

4. The system of claim 1 further including a second adder for determining the remainder by adding the additional value to the sum of the inverted high bit portion, the low bit portion, and the value of one.

5. A system for performing modulo multiplication of two numbers N bits in length with a modulus equal to $2^N+1$ and where a value of zero is used to represent 2 N and where each of the numbers has a value less than a value of the modulus, the system comprising:

a multiplier module for multiplying the two numbers to yield a resulting product having a high bit portion and a low bit portion;

an inverter module coupled to the multiplier module for inverting the bits of the high bit portion;

a compare module coupled to the multiplier module for comparing the high bit portion and the low bit portion to determine an additional value; and a first adder module coupled to the multiplier module and the inverter module for determining a remainder from a sum of the inverted high bit portion, the low bit portion, a value of one and the additional value.

6. The system of claim 1, further including a second adder for adding the additional value to the sum of the inverted high bit portion, the low bit portion, and the value of one.

7. The system of claim 5, wherein the compare module
   determines that the additional value is a first value wherein if the high bit portion is greater than the low bit portion, and
   determines that the additional value is a second value wherein if the high bit portion is less than or equal to the low bit portion.

8. The system of claim 5, wherein the adder module truncates one or more bits from the remainder that exceeds the N bit length of the two numbers.

9. The system of claim 5, wherein the system is used to perform cryptography.

10. The system of claim 5, wherein the cryptography performed is the IDEA cipher method.

11. A computer implemented method for performing modulo multiplication of two numbers N+1 bits in length with a modulus equal to $2^N+1$ and where each of the numbers has a value less than a value of the modulus, the method comprising:

multiplying two numbers to yield a resulting product having a 2N+1 bit, a high bit portion and a low bit portion;

inverting all bits of the high bit portion;

determining a remainder from a sum of the inverted high bit portion, the low bit portion and a value of one;

comparing the high bit portion and the low bit portion to determine an additional value; and adding the additional value to the remainder.

12. A computer implemented method of claim 11 further including the step of:

determining the additional value by performing an OR function of the first value and the 2N+1 bit if the high bit portion is greater than the low bit portion and by performing an OR function of the second value and the 2N+1 bit if the high bit portion is less than or equal to the low bit portion.

13. A computer implemented method for performing modulo multiplication of two numbers N bits in length with a modulus equal to $2^N+1$ and where a value of zero is used to represent $2^N$ and where each of the numbers has a value less than a value of the modulus, the method comprising:

multiplying two numbers to yield a resulting product having a high bit portion and a low bit portion;

inverting all bits of the high bit portion;

determining a remainder from a sum of the inverted high bit portion, the low bit portion and a value of one;

comparing the high bit portion and the low bit portion to determine an additional value; and adding the additional value to the remainder.

14. The computer implemented method of claim 13, wherein the adding step further includes the steps of:

determining that the additional value has a first value wherein if the high bit portion is greater than the low bit portion, and determining that the additional value has a second value wherein if the high bit portion is less than or equal to the low bit portion.

15. The computer implemented method of claim 13 further including the step of:

truncating one or more bits from the remainder that exceeds the N bit length of the two numbers.

16. The computer implemented method of claim 13, wherein the method is used to perform cryptography.

17. The computer implemented method of claim 16, wherein the cryptography performed is the IDEA cipher method.

\* \* \* \* \*

UNITED STATES PATENT AND TRADEMARK OFFICE
CERTIFICATE OF CORRECTION

PATENT NO. : 6,321,247 B1  Page 1 of 1
DATED : November 20, 2001
INVENTOR(S) : Donald P. Matthews, Jr. and Susan K. Langford It is certified that error appears in the above-identified patent and that said Letters Patent is hereby corrected as shown below:

Column 10,
Line 35, replace "2 N" with -- $2^N$ --.

Signed and Sealed this

Fourth Day of June, 2002

Attest:

JAMES E. ROGAN
Attesting Officer   Director of the United States Patent and Trademark Office